United States Patent [19]

Namiki

[11] Patent Number: 4,571,643
[45] Date of Patent: Feb. 18, 1986

[54] VTR CIRCUIT ARRANGEMENT FOR RECORDING INDEX SIGNAL

[75] Inventor: Yasuomi Namiki, Yokohama, Japan

[73] Assignee: Victor Company of Japan Limited, Yokohama, Japan

[21] Appl. No.: 556,780

[22] Filed: Dec. 1, 1983

[30] Foreign Application Priority Data

Dec. 2, 1982 [JP] Japan .................. 57-212023

[51] Int. Cl.$^4$ .................. G11B 5/03; G11B 6/02
[52] U.S. Cl. .................. 360/66; 360/18; 360/72.2
[58] Field of Search .................. 360/14, 18, 66, 72.2

[56] References Cited

U.S. PATENT DOCUMENTS 4,005,481  1/1977  Lackner .................. 360/60

FOREIGN PATENT DOCUMENTS 1412705  10/1970  Fed. Rep. of Germany ........ 360/66
3146097   8/1982  Fed. Rep. of Germany ........ 360/66

OTHER PUBLICATIONS

DD-Buch SCHOLZ, Christian: Magnetbandspeichertechnik, Berlin 1969, p. 19.

Primary Examiner—Vincent P. Canney
Attorney, Agent, or Firm—Cushman, Darby & Cushman

[57] ABSTRACT

In a video tape recorder of a helical scan type, a low frequency index signal and a high frequency signal are simultaneously applied to a full erase head (FE) with the high frequency signal acting as a bias prior to the recording of a video program. After the index signal has been recorded, the application of the high frequency signal is continued to erase a prerecorded material. The high frequency biasing prevents the index signal from interfering with the video signal during playback.

6 Claims, 5 Drawing Figures

VTR CIRCUIT ARRANGEMENT FOR RECORDING INDEX SIGNAL

BACKGROUND OF THE INVENTION

The present invention relates generally to helical scan video tape recorders, and in particular to a circuit arrangement for recording an index signal at the beginning of a video program which enables a program search circuit to quickly detect the beginning of a desired program.

It is known in the art to record an index signal at the beginning of each video program to allow it to be quickly searched during playback. The index signal currently in use is a train of rectangular pulses at a repetition frequency of 30 Hz which is coupled through a switched connection to a full erase head of the video recorder while decoupling a high frequency signal. The high frequency signal is then applied to the erase head after the index signal has been recorded in order to erase a prerecorded material. Since the full erase head is located upstream of the video head in the direction of motion of video tape, the beginning of the video program overlaps with the portion in which the index signal is recorded. Due to the relatively low frequency of the index signal in relation to the speed of tape, the index signal is recorded in a deeper area of the tape and the video signal is recorded in the tape's upper area. However, since the index signal is directly recorded in the video tape without high frequency bias and since the video signal has been converted to a low frequency range of the video spectrum prior to recording, the index signal interferes with the video signal detected from the overlapped portion of the tape during playback modes.

SUMMARY OF THE INVENTION

The invention provides a circuit arrangement for use in a video tape recorder of the helical scan type for recording an index signal prior to the recording of a video signal. The recorder includes an erase head for erasing a material prerecorded on a video tape and a video head mounted on a rotary drum for recording the video signal, the video head being located downstream of the erase head in the direction of movement of the video tape. The circuit arrangement comprises a first circuit for generating a low frequency index signal for a predetermined duration prior to the recording of the video signal, and a second circuit for generating a high frequency signal simultaneously with the index signal and continuously after the termination of the index signal. The circuit arrangement is characterized by means for directly coupling the index signal and the high frequency signal to the erase head to record the index signal so that the high frequency signal acts as a bias and to allow the high frequency signal to erase the prerecorded material after the index signal has been recorded.

BRIEF DESCRIPTION OF THE DRAWINGS

The present invention will be described in further detail with reference to the accompanying drawings, in which.

DETAILED DESCRIPTION

Figure 1:
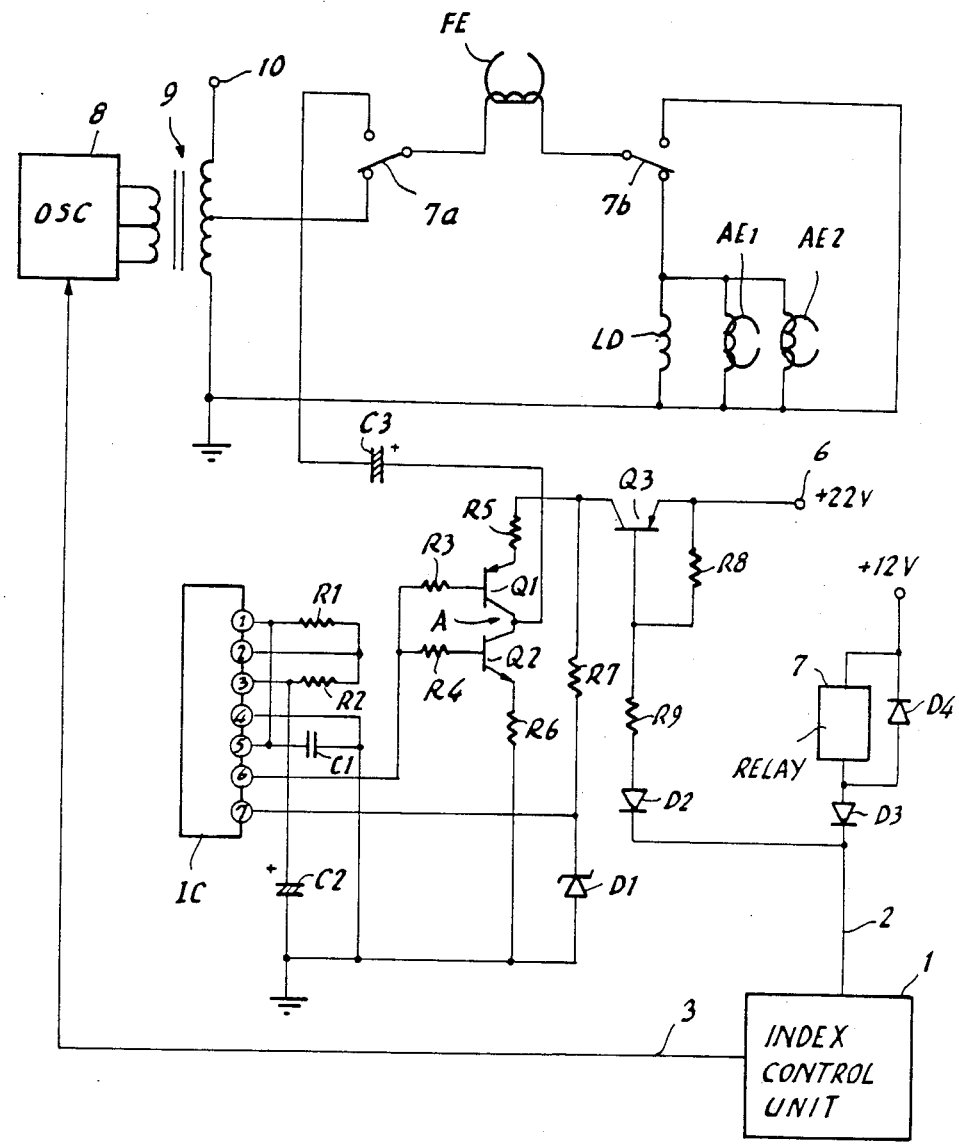
FIG. 1 is a block diagram of the prior art index signal recording circuit.

Before describing the present invention, it is appropriate to describe a prior art index signal recording circuit for helical-scan video tape recorders with reference to FIG. 1. When the VTR starts recording a program, an index control unit 1 applies a 1-second, negative going pulse to a lead 2 to turn on diodes D1 and D2 and a high-level control signal via a lead 3 to a high frequency bias oscillator 8 to de-activate its oscillation. The turn-on of diode D2 causes a voltage to occur at the junction of resistors R8 and R9 that turns on a pnp transistor Q3. The turn-on of transistor Q3 applies the +22-v potential through resistor R5 to the emitter of a pnp transistor Q1 and further applies it through resistor R7 to the cathode of Zener diode D1 to develop a constant voltage. This constant voltage is used to charge a capacitor C2 which is coupled to the #7 pin terminal of an integrated circuit pulse generator IC. The pulse generator IC is energized to generate a train of rectangular pulses with the frame frequency of 30 Hz as determined by resistors R1, R2 and a capacitor C1. This pulse train is supplied from the #6 pin terminal to the bases of a pnp transistor Q1 and an npn transistor Q2 through resistors R3 and R4, respectively, with the result that a current is supplied from the terminal 6 through transistor Q3, resistor R5, transistors Q1 and Q2 and resistor R6 to ground, developing a voltage at a junction A between the collectors of Q1 and Q2. The collector voltage is of a rectangular waveform having a polarity opposite to the polarity of the voltage applied to the bases of transistors Q1, Q2.

The turn-on of diode D3, on the other hand, energizes a relay 7 to switch its relay contacts 7a and 7b completing a circuit from the junction A through a capacitor C3, contacts 7a, a full erase head FE, contacts 7b to ground. The full erase head FE now acts as a recording head to record the 30-Hz rectangular pulses on a video tape as an index signal at the beginning of a material to be subsequently recorded. Upon the termination of the 1-second pulse on lead 2, diode D2 and transistor Q3 turn off to de-energize the pulse generator IC and diode D3 turns off de-energizing relay 7, and the voltage on lead 3 goes low to energize the oscillator 8 which generates a 70 kHz signal. This high frequency signal is applied as an erase signal by a transformer 19 to the full erase head FE and thence to audio erase heads AE1 and AE2 which are in shunt with a dummy load coil LD, and also delivered as a high frequency bias from a terminal 10 to the video and audio record/playback heads, not shown, which are located between the full erase head FE and audio erase heads AE1, AE2.

The 30-Hz index signal is thus recorded for a period of 1 second on the full-width of the video tape as it moves past the full erase head FE. Subsequently, the video signal is recorded as it contacts the video head on the portion of the tape where the index signal is recorded. It is noted that since the the relative speed of the tape to the full erase head FE, typically 3.335 cm/sec, the wavelength of the recorded index signal is considerably long as compared with other recorded signals. As a result, the magnetic flux lines produced by the full erase head FE penetrate deep into a lower region of the magnetic layer of the tape when recording the index signal than the region in which the video signal is recorded by the video head rotating with a speed of 5.8 m/sec relative to the tape. The recorded index signal is therefore not disturbed or erased when the video signal is recorded.

However, the index signal, when reproduced, can act as a source of noise to the circuit that reproduces the recorded color carrier whose frequency has been converted to a lower frequency region of the video spectrum from the original 3.58 MHz, causing a moving band of moire pattern to appear in the viewing screen for a period which may vary from 4 to 10 seconds depending on the different formats of the various standard color television systems. Furthermore, if a short-duration (typically a few seconds) material is recorded, the indexed portion of the tape may stop short of the audio erase heads AE1, AE2 and those areas which would otherwise be erased by these heads generate a noise which is 12 dB higher than the nominal level when the short-duration material is reproduced later. Moreover, even if a long-period material is recorded, the index signal recorded in the guardband area between heads AE1 and AE2 is not completely erased by these heads and generates a noise (typically 3 dB higher than nominal) when such tapes are reproduced on an apparatus having a single audio head. Furthermore, the use of the relay for switching the index signal adds to power consumption and equipment cost.

The present invention will now be described with reference to FIG. 2 in which parts corresponding to those in FIG. 1 are marked with the same numerals as used in FIG. 1. The recording circuit shown in FIG. 2 comprises a first integrator formed by a resistor R11 and a capacitor C11 and a second integrator which is formed by a resistor R12 and a capacitor C12 and coupled to the first integrator. The first integrator is coupled from a drum pulse source 13 which provides a 30-Hz pulse to the rotary drum on which the video head is mounted. The drum pulse is integrated successively by the first and second integrators so that a voltage of sinusoidal waveform is generated. The sinusoidal voltage signal is applied to the noninverting input of an operational amplifier 14 whose inverting input is coupled by a circuit including a resistor R15 and a capacitor C14 to ground and by a gain adjusting resistor R16 to the output of amplifier 14. The noninverting input of amplifier 14 is further coupled by a resistor R13 to a voltage source Vcc and by a circuit including a resistor R14 and a diode D5 to the terminal 2 of the index control unit 1. The operational amplifier 14 is of the type having a high input impedance and a low output impedance and capable of delivering a sufficient amount of output current. Types uPC4556C and uPC4557C are found suitable for this purpose. In a practical embodiment, the resistors R11 and R12 have a resistance value of 47 kiloohms each and the capacitors C11 and C12 have a capacitance value of 0.47 microfarads each.

The output of the operational amplifier 14 is coupled by a circuit including a capacitor C15 and a level adjustment resistor R17 to a junction between a coil L1 and a capacitor C16 which are connected in series from the full erase head FE to ground to form a filter circuit to prevent the high frequency bias from oscillator 8 from being impressed upon the output of the operational amplifier 14. Care should be taken of determining the resistance value of adjustment resistor R17 since a too small value would substantially establish a short circuit between the output of amplifier 14 and ground and cause an oscillation to occur. Appropriate values for the coil L1 and capacitor C16 are 8.2 mH and $68 \times 10^3$ pF, respectively. The high frequency bias voltage developed at the junction between head FE and coil L1 is typically 33 Vp-p which is attenuated to as low as 350 mVp-p which appears at the junction between coil L1 and capacitor C16. Capacitor C16 needs not to withstand high tension voltages. Since the inductance values of the audio erase heads AE1 and AE2 are much smaller than coil L1, the provision of the coil L1 produces no adverse effects on the operation of the erase heads AE1 and AE2.

The full erase head FE has one of its terminals coupled directly to the secondary winding of the transformer 9 and the other terminal coupled through capacitor C17 to the dummy coil LD and audio erase heads AE1, AE2. The capacitor C17 acts as a blocking capacitor providing a high impedance to the 30-Hz index signal to prevent it from being applied to the audio erase heads AE1 and AE2, while at the same time acting as a coupling capacitor to allow the 70 kHz bias signal to be applied to the audio heads. A suitable value for the blocking capacitor C17 is typically 1 uF and the voltage developed across this capacitor is 1 Vp-p. No appreciable amount of loss is introduced by the capacitor C17 in relation to the prior art circuit of FIG. 1.

Figure 3:
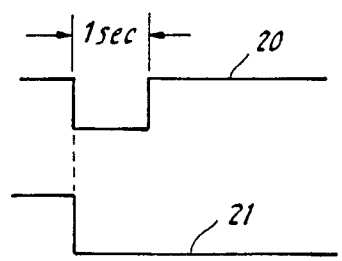
FIG. 3 is an illustration of the waveforms of typical control signals.

The operation of the recording circuit of the invention is as follows. At the start of a recording mode, the index control circuit 1 is energized to apply a 1-second period negative-going pulse 20, shown in FIG. 3, to the line 2 to turn on diode D5 and simultaneously provides a low level signal 21 to the line 3. The turn-on of diode D5 causes the DC bias potential at the noninverting input of the operational amplifier 14 to drop to one-half the 12-volt potential of the voltage supply Vcc, so that the amplifier 14 is set to an optimum operating point. The oscillator 8 is energized in response to the signal 21 to generate a 70-kHz bias signal which is coupled by way of transformer 9 to the erase heads FE and AE1, AE2.

On the other hand, 30-Hz drum pulses are supplied from the pulse source 13 to the cascaded integrators formed by C11, R11, C12, R12 which convert the pulses into a form which is approximately sinusoidal. The pseudo-sinusoidal 30-Hz signal is the index signal, which is amplified by the amplifier 14 and passed through capacitor C15 and resistor R17 and through coil L1 to the full erase head FE. The capacitor C17 blocks the 30-Hz signal to cause it to flow through the full erase head FE, while passing the 70 kHz bias signal to the audio erase heads AE1, AE2. Thus, the 30-Hz index signal is recorded on a videotape with the 70-kHz bias signal for a 1-second period. The recording of index signal proceeds simultaneously with the erasing operation of the audio erase heads AE1, AE2.

Upon the termination of the 1-second period, the diode D5 is turned off and the potential at the noninverting input of amplifier 14 rises to the 12-volt potential of the voltage supply Vcc, so that the operating point of amplifier 14 is shifted to a point at which the output voltage of amplifier 14 remains at a constant level. Thus, the application of the index signal is terminated in response to the trailing edge of the 1-second index control signal 20, while the oscillator 8 is continuously energized to supply the high frequency bias to the erase heads FE, AE1 and AE2 as an erase signal thereafter. A video program is recorded simultaneously with the recording of the index signal. The beginning portion of the program is recorded in an area overlying the lower region in which the index signal is recorded.

Figure 4:
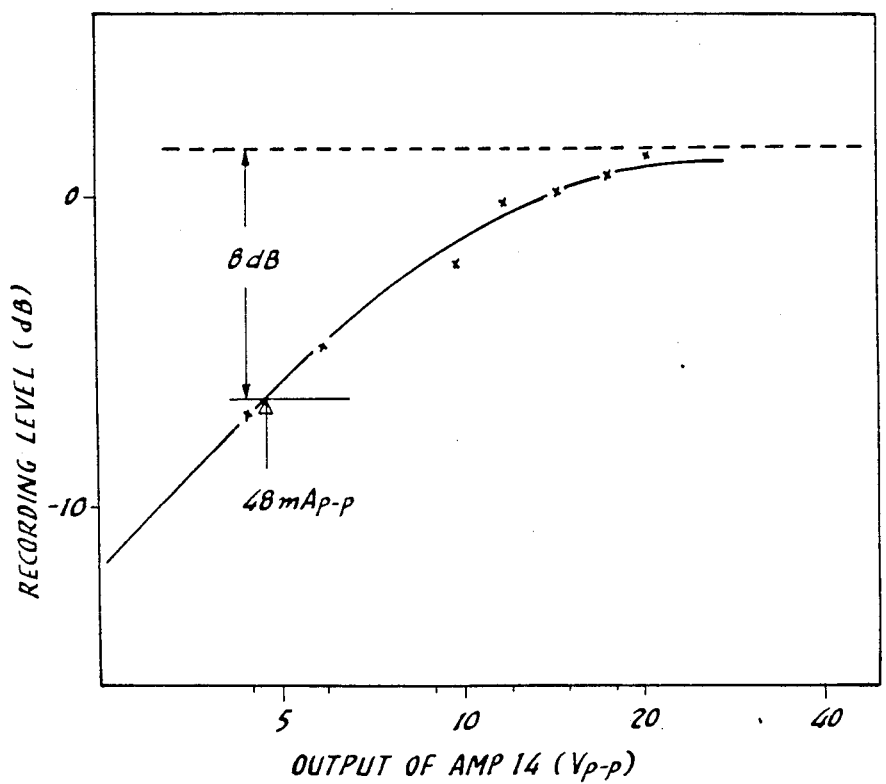
FIG. 4 is a graphic illustration of the recording level of index signal plotted as a function of the output of an operational amplifier.

FIG. 4 is an illustration of the recording level of the index signal plotted as a function of the voltage developed at the output of amplifier 14 when the videotape is transported at a speed of 3.34 cm/sec. The value of level adjustment resistor R17 is so chosen that the recording level of the index signal is −8 dB with respect to the saturation level of the full erase head FE. As shown in FIG. 4, the −8 dB point is obtained when the input current is 48 mAp-p and the input voltage is about 46 mVp-p as measured at the output of the amplifier 14. The recording current I is given as follows:

$$I = V\text{op-out}/(R_L + R_F + R\text{osc} + R17)$$

where,

Vop-out = output voltage of the operational amplifier 14
$R_L$ = resistance of coil $L_1$
$R_F$ = resistance of full erase head FE
Rosc = resistance of the secondary winding of transformer 9.

In a typical example, $R_L$, $R_F$ and Rosc are approximately 2.5 ohms, 0.36 ohms and 1.7 ohms, respectively. Since I is 48 mAp-p and Vop-out is approximately 46 mVp-p to obtain a −8 dB reduction from the saturation level, an appropriate value of the resistor R17 is approximately 68.7 ohms.

Due to the high frequency biased recording, the low-frequency converted color video signal which is recorded over the idex portion of the program produces no harmful effect. Since the index signal is recored at a −8 dB point with respect to the saturation level, the level of noise introduced by the index signal is reduced from the prior-art 4 Vp-p value to 0.8 Vp-p, an improvement of −14 dB when a short-duration program is reproduced or a VTR having a single audio channel is used for playback. Moreover, since the index signal is pseudo-sinusoidal, the higher harmonics are kept to a minimum, which can be appreciated by the human ears as an improvement of more than 20 dB.

Figure 2:
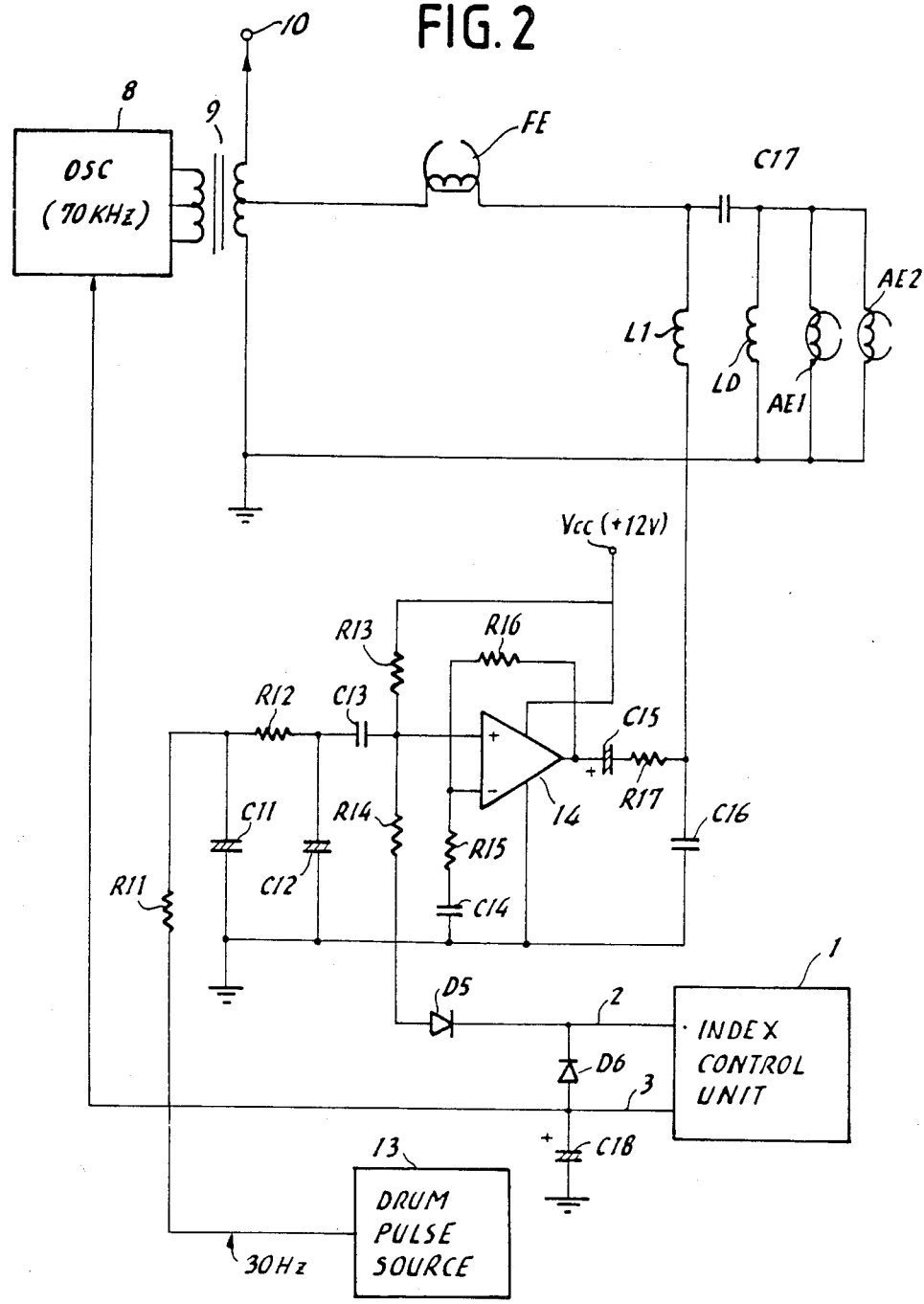
FIG. 2 is a circuit diagram of an embodiment of the invention.
Figure 5:
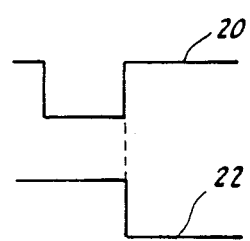
FIG. 5 is an illustration of the waveforms of different control signals.

If use is made of an index control unit 1 of the type which generates a control signal 22 which goes low at the trailing edge of the pulse 20 as shown in FIG. 5, it is appropriate to connect a diode D6 between the leads 2 and 3 and a capacitor 18 between the lead 3 and ground, as shown in FIG. 2. With this arrangement, the oscillator 8 is energized in response to the leading edge of the pulse 20.

If use is made of a VTR having a field frequency of 50 Hz in which the rotary video head is driven at a speed of 25 revolutions per second and the drum pulse occurs at a repetition frequency of 25 Hz, an appropriate value of the resistor R12 is 56 kiloohms to prevent the sinusoidal index signal from being clipped by the operational amplifier 14.

What is claimed is:

1. A circuit arrangement for use in a video tape recorder of the helical scan type for recording an index signal prior to the recording of a video signal, said recorder including an erase head for erasing a material prerecorded on a video tape and a video head mounted on a rotary drum for recording said video signal, the video head being located downstream of the erase head in the direction of movement of the video tape, comprising:

a first circuit for generating a low frequency index signal for a predetermind duration prior to the recording of said video signal;

a second circuit for generating a high frequency signal simultaneously with said index signal and continuously after the termination of said index signal; and means for directly coupling said index signal and said high frequency signal to said erase head to record said index signal on said tape with the high frequency signal acting as a bias and to allow said high frequency signal to erase said prerecorded material after said index signal has been recorded.

2. A circuit arrangement as claimed in claim 1, wherein said first circuit comprises means for generating a sinusoidal waveform in synchronism with the rotation of said video head.

3. A circuit arrangement as claimed in claim 2, wherein said generating means comprises means for integrating a pulse which occurs in synchronism with the rotation of said video head into said sinusoidal waveform.

4. A circuit arrangement as claimed in claim 1, wherein said coupling means comprises filter means coupled between said erase head and the output of said first circuit for providing a high impedance to said high frequency signal and providing a low impedance to said index signal.

5. A circuit arrangement as claimed in claim 4, wherein said erase head is a full erase head adapted to erase a prerecorded material across the full width of the video tape, and wherein said coupling means further comprises a capacitor connected between said full erase head and an additional head, said capacitor having such a capacitance value that said high frequency signal is allowed to pass therethrough to said additional erase head and said index signal is prevented from being applied to said additional erase head, said filter means being coupled between the output of said first circuit and a junction between said capacitor and said full erase head.

6. A circuit arrangement as claimed in claim 4, wherein said first circuit further comprises an amplifier for amplifying said sinusoidal signal and operable in a range from an optimum operating point to a saturation point where said full erase head is saturated, said amplifier being variable from said saturation point to said optimum operating point when said index signal is recorded, and means for adjusting the output level of said amplifier so that the amplified sinusoidal signal is attenuated by a predetermined amount with respect to said saturation point.

* * * * *